(12) United States Patent
Mahani et al.

(10) Patent No.: US 11,379,164 B2
(45) Date of Patent: Jul. 5, 2022

(54) ENHANCED DATA COLLECTION AND GUI FOR PRODUCTION PRINT SYSTEM

(71) Applicants: Maryamossadat Nematollahi Mahani, Boulder, CO (US); Vlad Alin Iordachescu, Mosnita veche (RO)

(72) Inventors: Maryamossadat Nematollahi Mahani, Boulder, CO (US); Vlad Alin Iordachescu, Mosnita veche (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/837,238

(22) Filed: Apr. 1, 2020

(65) Prior Publication Data
US 2021/0311675 A1 Oct. 7, 2021

(51) Int. Cl.
*G06F 3/12* (2006.01)
*G06F 3/04847* (2022.01)

(52) U.S. Cl.
CPC ........ *G06F 3/1208* (2013.01); *G06F 3/04847* (2013.01); *G06F 3/1219* (2013.01); *G06F 3/1256* (2013.01); *G06F 3/12* (2013.01)

(58) Field of Classification Search
CPC .. G06F 3/1208; G06F 3/1256; G06F 3/04847; G06F 3/1219; G06F 3/1229; G06F 3/1285; G06F 3/12
USPC ...................................................... 358/1.14
See application file for complete search history.

(56) References Cited

U.S. PATENT DOCUMENTS

| | | | |
|---|---|---|---|
| 7,962,050 B2 | 6/2011 | Shustef et al. | |
| 8,917,412 B2* | 12/2014 | Kakegawa | G06F 3/1244 358/1.15 |
| 9,656,463 B1 | 5/2017 | Ernst et al. | |
| 9,665,327 B1 | 5/2017 | Yokoohji et al. | |

(Continued)

FOREIGN PATENT DOCUMENTS

| | | |
|---|---|---|
| CN | 103646477 B | 8/2016 |
| JP | H09183232 A | 7/1997 |
| JP | 2010122431 A | 6/2010 |

OTHER PUBLICATIONS

Weaver Robert and Neagle Robert, Apr. 4, 2017, IN-201747012204 Publication English Translation, Abstract, Published Apr. 14, 2017, System and method for remotely servicing an industrial printer.*

(Continued)

*Primary Examiner* — Darryl V Dottin
(74) *Attorney, Agent, or Firm* — Duft & Bornsen, PC

(57) ABSTRACT

Systems and methods are provided for enhanced data collection for a print system. One embodiment includes a printer terminal device that retrieves historical values of print material usage of previous print jobs that correspond with a print job, determines an estimate value range of print material usage for the print job based on the historical values, and presents a Graphical User Interface (GUI) at a display of the printer terminal device to receive user input of a current value of print material usage for the print job. In response to determining that the current value of print material usage is outside the estimate value range, the printer terminal device displays at the GUI a prompt for user input to validate that the current value is abnormal, and, if validated, provides the current value to the print job database to update the historical values of print material usage.

20 Claims, 5 Drawing Sheets

(56) References Cited

U.S. PATENT DOCUMENTS

| | | | |
|---|---|---|---|
| 9,684,856 B2 | 6/2017 | Suzuki | |
| 2002/0043173 A1* | 4/2002 | Horii | G03G 15/5079 |
| | | | 101/484 |
| 2004/0085565 A1* | 5/2004 | Owen | G06Q 10/06 |
| | | | 358/1.14 |
| 2014/0239056 A1* | 8/2014 | Tsongas | G06K 19/0614 |
| | | | 235/462.11 |
| 2019/0287038 A1* | 9/2019 | Oi | G03G 15/553 |

OTHER PUBLICATIONS

Maria Nikolova; Financefeeds; Interactive Brokers enables traders to make use of precautionary settings in mobile app; https://financefeeds.com; Sep. 20, 2019.

Subutai Ahmad et al; Unsupervied real-time anomaly detection for streaming date; Elsevier Journal, Neurocomputing; 2017.

European Search Report; Application EP21165479; dated Aug. 20, 2021.

\* cited by examiner

ENHANCED DATA COLLECTION AND GUI FOR PRODUCTION PRINT SYSTEM

FIELD

The disclosure relates to the field of printing, and in particular, to data collection of print jobs.

BACKGROUND

Production printers, which can print hundreds of pages per minute, typically require a setup time and one or more practice runs before executing a particular print job. For example, a print operator may spend up to an hour re-aligning printheads and re-printing practice runs on a thousand sheets of paper before initiating a print job that will go on to print tens of thousands of sheets every hour for several hours. Time and printing material (e.g., paper and ink) spent during setup is sometimes referred to as "waste" for that print job since those resources are not directly used to produce the printed output.

In addition to their other duties, print operators are tasked with recording (e.g., typically with pen and paper) the waste incurred for each print job. Oftentimes, in an effort to finish their other primary tasks, the print operator may unintentionally record inaccurate entries regarding waste and other metrics for print jobs. Therefore, print shops may sometimes employ someone to manually review print job data for integrity, costing additional time and expense. Or a print shop may simply decide to not record print job data which, if it had been accurately recorded, could have been used as a basis for identifying inefficiencies and improving print shop operation.

SUMMARY

Embodiments described herein provide for enhanced data collection for a print system. Data collection on a Graphical User Interface (GUI) for a print system takes into consideration historical data and past actions to ensure the accuracy of data reported by print operators. The historical data may be grouped on different metadata such as job type, printer, and duration to create an expected value. Values within a threshold of this expected value may be automatically accepted, whereas values outside the threshold may indicate a potential user error. Over time, the system is able to adapt to create additional categories as new data is collected. Thus, the GUI advantageously helps print operators record and track print job data in a manner that is accurate and convenient.

One embodiment is a system that includes a printer terminal device in communication with a printer and configured to retrieve metadata of a print job scheduled to print with the printer. The printer terminal device is further in communication with a print job database and configured to retrieve historical values of print material usage of previous print jobs that correspond with the print job. The printer terminal device is further configured to determine an estimate value range of print material usage for the print job based on the historical values, and to present a Graphical User Interface (GUI) at a display of the printer terminal device to receive user input of a current value of print material usage for the print job. In response to determining that the current value of print material usage is outside the estimate value range, the printer terminal device is configured to display at the GUI a prompt for user input to validate that the current value is abnormal. And, in response to receiving user input validating that the current value is abnormal, the printer terminal device is configured to provide the current value to the print job database to update the historical values of print material usage.

A further embodiment is a method. The method receiving a print job to be printed with a printer, and retrieving, from a print job database, historical values of print material usage of previous print jobs that correspond with the print job. The method further includes determining an estimate value range of print material usage for the print job based on the historical values, and presenting a Graphical User Interface (GUI) at a display to receive user input of a current value of print material usage for the print job. In response to determining that the current value of print material usage is outside the estimate value range, the method includes displaying at the GUI a prompt for user input to validate that the current value is abnormal. And, in response to receiving user input validating that the current value is abnormal, the method includes providing the current value to the print job database to update the historical values of print material usage.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific example embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
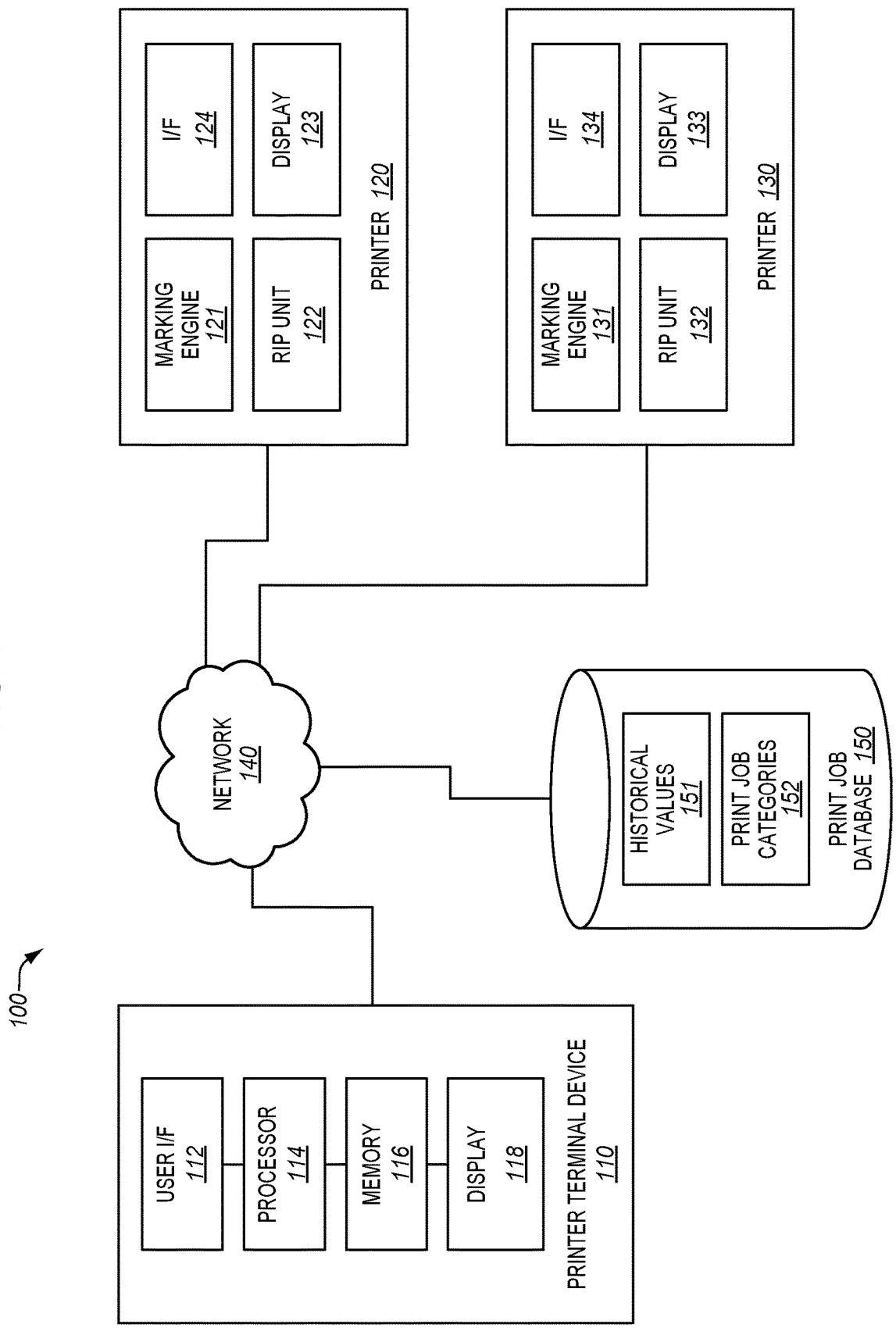
FIG. 1 is a block diagram of a print system in an illustrative embodiment.

FIG. 1 is a block diagram of a print system 100 in an illustrative embodiment. The print system 100 comprises any systems, devices, or components operable to print incoming print jobs. The print system 100 may be managed and monitored by a user, or print operator, interacting with a printer terminal device 110 in communication with printers 120 and 130 via a network 140. Generally, the printer terminal device 110 includes a display 118 to present one or more Graphical User Interfaces (GUIs) to the user, and utilizes user interface (I/F) 112 to receive user input pertaining to presented GUIs. For example, in some embodiments, the printer terminal device 110 comprises a tablet or similar device in which the display 118 and user I/F 112 are integrated in the form of a touch screen that the user may directly interact with. Alternatively or additionally, the user I/F 112 may comprise a keyboard, mouse, etc. for interacting with controls presented on such GUIs.

The printer terminal device 110 also communicates with a print job database 150 via the network 140. The print job database 150 stores data of previous print jobs that have been printed by the print system 100. In particular, the print job database 150 may store historical values 151 or metrics of previous print jobs, and may further store print job categories 152 which groups previous print jobs by various combinations of shared characteristics. As will be described in greater detail below, the printer terminal device 110 is enhanced to improve accuracy of print job metrics reported by print operator by referencing relevant data in the print job database 150 for comparison, and displaying a prompt for the print operator to either confirm or correct their input if the input is deemed abnormal based on the comparison.

Generally, the printer terminal device 110 manages user interactions to facilitate the handling of print jobs to be printed with the printers 120/130. The network 140 carries communications between the printer terminal device 110 and printers 120 and 130 based on user interactions with GUIs presented via display 118. The network 140 comprises any combination of devices and components for routing communications between the printer terminal device 110, print job database 150, and printers 120 and 130. For example, the network 140 may comprise the Internet, a local intranet, etc. The printer terminal device 110, print job database 150, and printers 120/130 may include an Ethernet interface, Wi-Fi interface, etc. for engaging in communications with network 140. Although the printer terminal device 110 and print job database 150 are shown and described as separate, remote components, it will be appreciated that, in some embodiments, the print system 100 may implement cloud functionality in which processing/storage functions of the printer terminal device 110 and print job database 150 may be at least partially implemented in the other, or implemented remotely via other component(s) or sever(s) connected to the network 140.

The printers 120 and 130 physically mark print media based on received print jobs. While only two printers are illustrated, in further embodiments any suitable number of printers may be managed by the printer terminal device 110. In this embodiment, printer 120 includes I/F 124 for exchanging data via the network 140. In response to receiving print data from the network 140, the printer 120 may engage in rasterization of the print data via Rasterization Image Processing (RIP) unit 122, which may include multiple Rasterization Image Processors. The rasterized print data may then be used to direct the operations of a marking engine 121 (e.g., an inkjet marking engine, laser print engine, etc.) in order to mark physical media. The printer 120 may also include a display 123. In some embodiments, functions and/or GUIs described with respect to the display 118 of the printer terminal device 110 may alternatively or additionally be implemented with the display 123 of the printer 120. The printer 130 includes similar elements to those of printer 120, such as marking engine 131, RIP unit 132, display 133, and I/F 134.

In one embodiment, the printer terminal device includes a processor 114 and memory 116. The processor 114 is operable to perform the functions of the printer terminal device 110, and may be implemented as custom circuitry, as a hardware processor executing programmed instructions stored in memory 116, etc. Memory 116 may also store instructions for one or more GUIs to users of the printer terminal device 110. Memory 116 may be implemented as a solid-state memory, spinning disk, etc. in order to electronically store data. The particular arrangement, number, and configuration of components described herein are examples for purposes of discussion and are non-limiting. Illustrative details of the operation of the print system 100 will be discussed with regard to FIG. 2.

Figure 2:
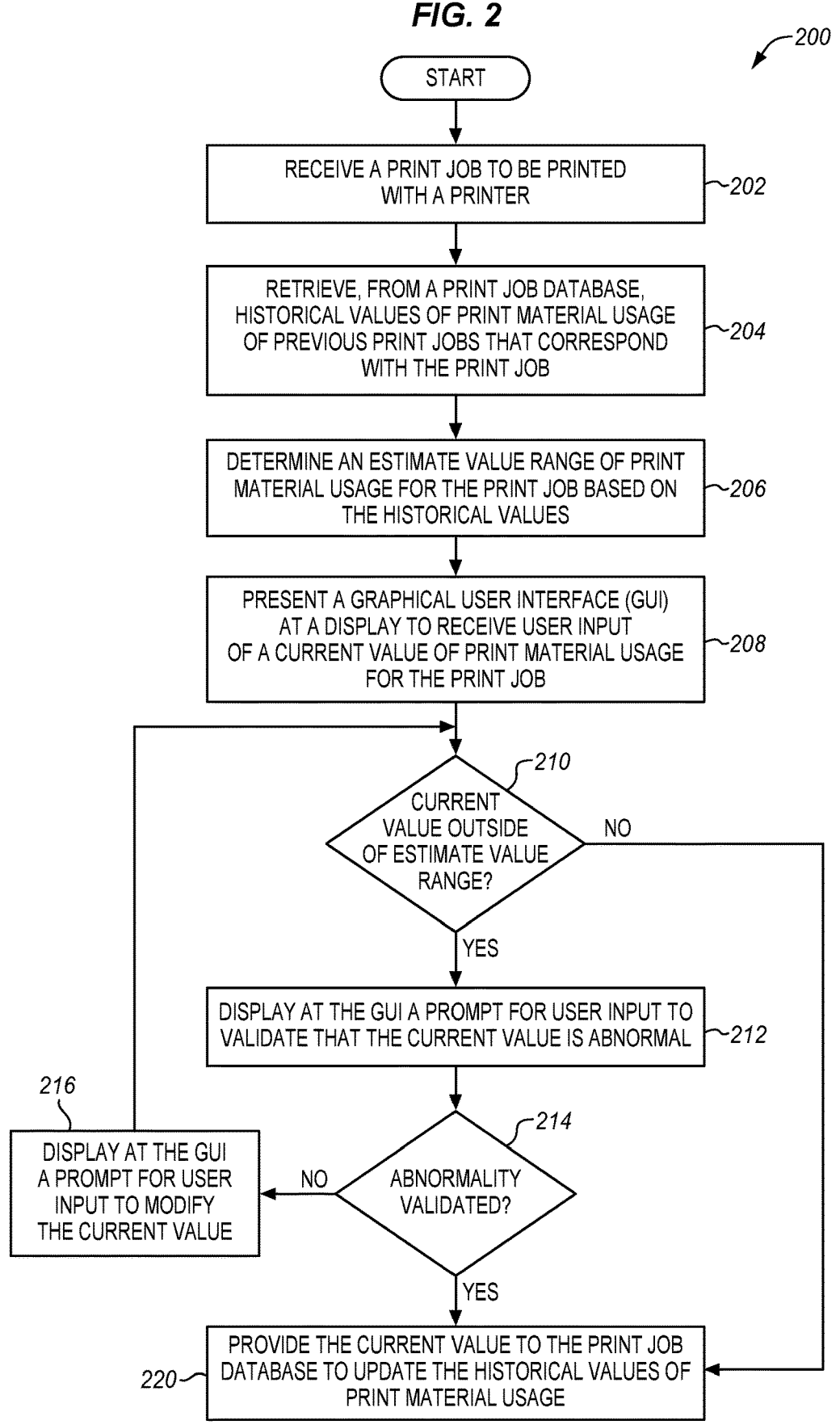
FIG. 2 is a flowchart illustrating a method for operating a printing system in an illustrative embodiment.

FIG. 2 is a flowchart illustrating a method 200 for operating a printing system in an illustrative embodiment. The steps of the method 200 are described with reference to the print system 100 of FIG. 1, but those skilled in the art will appreciate that the method 200 may be performed in other systems. The steps of the flowcharts described herein are not all inclusive, may include other steps not shown, and may be performed in an alternative order.

In step 202, a printer (e.g., printer 120) receives a print job for printing. After the print job is received (e.g., via I/F 124) but before the print job is initiated, the print job may be stored, queued, and/or scheduled for printing. The printer terminal device 110, being in communication with the printer, is configured to retrieve metadata of a print job scheduled to print with the printer. Metadata may include, for example, print job metadata such as print job type (e.g., simplex/duplex, business cards, calendars, statements, etc.), print job size (e.g., length, file size, number of sheets, etc.), print job name, and/or print job customer. Alternatively or additionally, metadata may include printer metadata for the print job such as a printer identifier, printer speed, operator identifier, and/or elapsed time per printer state.

In step 204, the printer terminal device 110 retrieves, from the print job database 150, historical values of print material usage of previous print jobs that correspond with the print job. The printer terminal device 110 may identify corresponding print jobs, or previous print jobs that share similar characteristics to that of the current print job, based on a combination of one or more types of metadata described above.

In step 206, the printer terminal device 110 determines an estimate value range of print material usage for the print job based on the historical values. For example, based on the print job size, print job type, and printer speed, the printer terminal device 110 may calculate/estimate a predicted amount of ink/paper that the print job is likely to use by referencing the recorded data of past print jobs with similar characteristics. Alternatively or additionally, the printer terminal device 110 may calculate/estimate the amount of time to setup and/or complete the print job taking into account past print jobs belonging to, for example, the same print job category and managed by the same print operator name. In some embodiments, the printer terminal device 110 may determine the estimate value range before initiating or printing the print job at the printer. In other embodiments, the printer terminal device 110 may determine the estimate value range before completing the print job at the printer. In still yet other embodiments, the printer terminal device 110 may determine the estimate value range after completing the print job at the printer.

In step 208, the printer terminal device 110 presents a GUI at a display of the printer terminal device 110 to receive user input of a current value of print material usage for the print job. For example, after detecting that the print job is completed, the printer terminal device 110 may display a prompt for the print operator to report a numerical value of wastage or number of impressions for the print job.

In step 210, the printer terminal device 110 determines whether the current value of print material usage (e.g., user input of step 208) is outside the estimate value range (e.g., determined in step 206). If the current value is outside the estimate value range, the method 200 proceeds to step 212 and the printer terminal device 110 displays at the GUI a prompt for user input to validate that the current value is abnormal. Next, in step 214, the printer terminal device 110 determines whether the user input has validated that the current value is abnormal. If so, the method 200 proceeds to step 220, and the printer terminal device 110 provides the current value to the print job database 150 to update the historical values of print material usage.

Otherwise, if in step 214 the user input does not validate that the current value is abnormal, the method 200 proceeds to step 216 and the printer terminal device 110 displays at the GUI a prompt for user input to modify the current value. Thereafter, the method 200 returns to step 210 to compare the operator input with the estimate value range. Moreover, if in step 210, the printer terminal device 110 determines that the operator input is within (or has been changed/modified to be within) the estimate value range, the method 200 proceeds to step 220 and provides the current value to the print job database 150 without displaying a warning or validation request since the input is considered normal.

Thus, in using the method 200, if a wastage value reported by the operator (e.g., in step 208) is erroneously entered, the printer terminal device 110 is able to detect the potential error and display a warning message of the abnormality. Additionally, the printer terminal device 110 automatically provides the appropriate prompts for the operator to validate and/or modify the value to improve the accuracy of metrics recorded for print jobs as they are processed while avoiding the cost and time of manually tracking wastage and/or manually verifying the data accuracy. Furthermore, using the method 200, the printer terminal device 110 is able to adapt to changes in the expected value range over time as the print operators accept/validate new values. As the data collected by the printer terminal device 110 adapts to the specific tendencies of the print system 100 and its users over time, the accuracy of data help the users learn what to expect and how to improve turn-around and efficiency.

Figure 3:
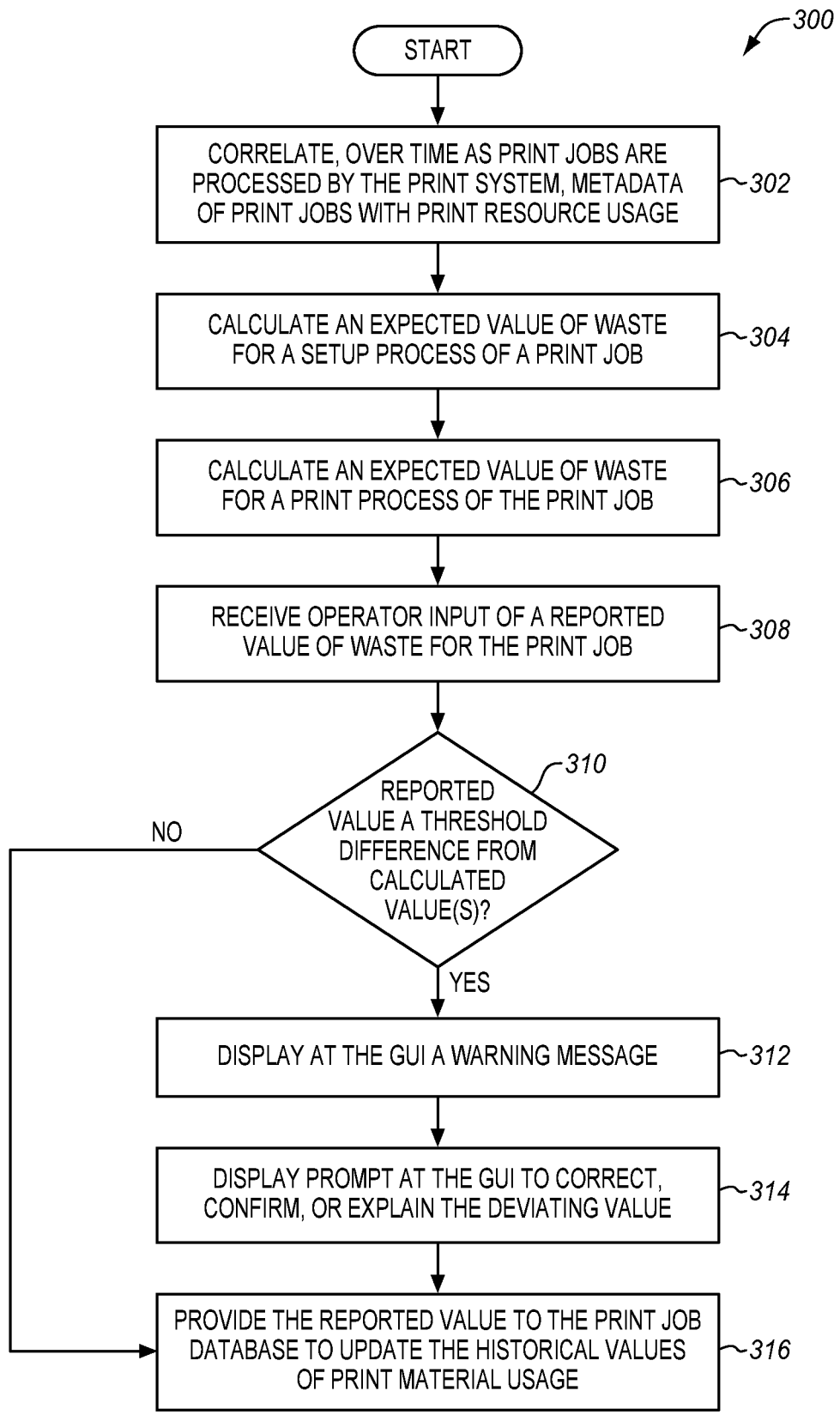
FIG. 3 is a flowchart illustrating a method for operating a printing system in another illustrative embodiment.

FIG. 3 is a flowchart illustrating a method 300 for operating a printing system in another illustrative embodiment. The steps of the method 300 are described with reference to the print system 100 of FIG. 1, but those skilled in the art will appreciate that the method 300 may be performed in other systems. The steps of the flowcharts described herein are not all inclusive, may include other steps not shown, and may be performed in an alternative order.

Assume, for this embodiment, that the print system 100 is initially newly installed. In step 302, the print job database 150 correlates, over time as print jobs are processed by the print system 100, metadata of the print jobs with print resource usage. For example, as the operator starts collecting data based on job types, printer, etc., the print job database 150 correlates other parameters such as run length or paper length. After a sufficient amount of data is acquired, the print system 100 may begin comparing entered data to the expected value range based on the job type and/or type of error/data entry. The correlation stored in the print job database 150 may be determined by the printer terminal device 110 and/or remote server(s) connected to the network 140.

In step 304, the printer terminal device 110 calculates an expected value of waste for a setup process of a print job. The setup process, sometimes referred to as make-ready, may differ from job to job. Setup for a particular type of print job may involve the print operator carefully calibrating printheads and printing test runs before the printer is ready to begin printing the print job. Time and printing material (e.g., paper and ink) spent during setup may be tracked and correlated with other characteristics of print jobs over time. For example, the print job database 150 may store efficiency patterns of various operators which, in combination with other factors such as job type, may be used to estimate the time and paper/ink a certain operator (e.g., based on experience level) may use during setup. A reported value of print resource usage may include one or more of an operator time value, a paper usage value, and an ink usage value for the setup process of the print job.

In step 306, the printer terminal device 110 calculates an expected value of waste for a print process of the print job. In step 308, the printer terminal device 110 receives operator input of a reported value of waste for the print job. In some embodiments, the printer terminal device 110 auto-fills/displays a determined estimate in a field, and allows the operator to either confirm/select the estimate as the reported value or edit/overwrite it to enter the reported value. In step 310, the printer terminal device 110 determines whether the reported value is a threshold difference from the calculated value(s). As such, the setup process and print process for a print job may be tracked and analyzed for waste accuracy separately or in combination. For example, the printer terminal device 110 may determine the estimate value range of print material usage for the setup of the print job based on historical values matching a print job type, operator identifier, and printer identifier, and refer to the determined estimate for comparison in response to operator input for setup waste. Alternatively or additionally, the printer terminal device 110 may determine the estimate value range of print material usage for execution of the print job based on a speed of the printer and elapsed time of the print job, and refer to that estimate.

If, in step 310, the reported value is a threshold difference from the calculated value(s), the method 300 proceeds to step 312 and the printer terminal device 110 displays a GUI indicating a warning message that the reported value is unexpected. Additionally, in step 314, the printer terminal device 110 may display a prompt on the GUI to correct, confirm, or explain the deviating value. Thereafter, in step 316, the printer terminal device 110 may provide the reported value to the print job database 150 to update the historical values of print material usage. Otherwise, if in step 310 the reported value is not a threshold difference from the calculated value(s), the method 300 may skip further prompts and provide the reported value to the print job database 150.

Examples

Figure 4:
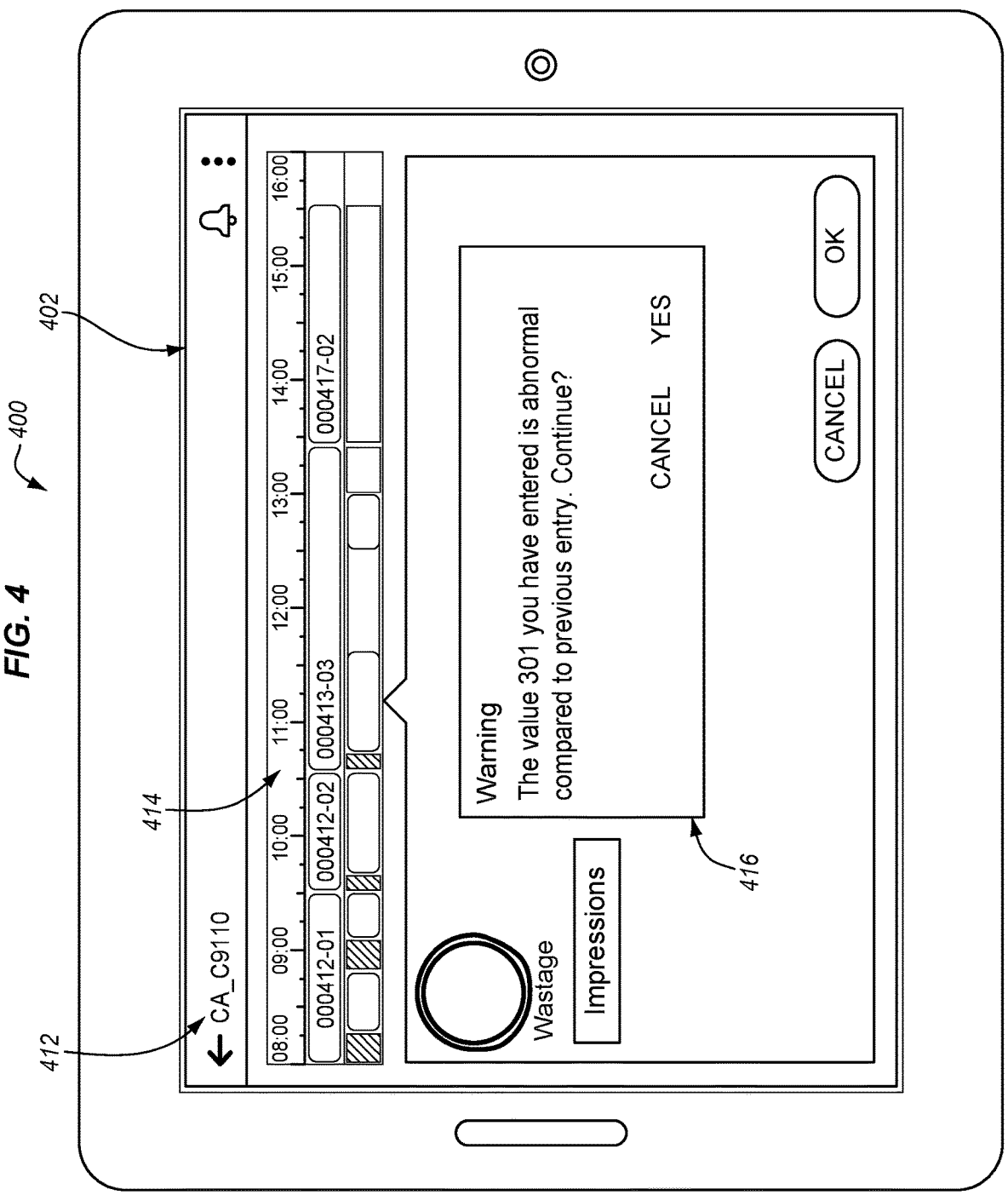
FIG. 4 shows a printer terminal device displaying a GUI that facilities improved print job data collection in an illustrative embodiment.

FIG. 4 shows a printer terminal device 400 displaying a GUI 402 that facilities improved print job data collection in an illustrative embodiment. In this example, the GUI 402 displays a printer identifier 412 of the printer being managed and a timeline 414 of activity of the printer including a status/list of print jobs printed, printing, and/or to be printed with the printer. A user may select a particular print job displayed on the printer terminal device 110 for further information and/or actions to take for the print job. Alternatively or additionally, the printer terminal device 110 may display/prompt the operator for input in response to an event detected for the print job, such as after setup and before execution of the print job, or in response to a pause/error in printing or an end to printing the print job. Further, in this example, the GUI 402 displays a message 416 including a warning and/or request for validation that the metric reported for a print job is abnormal. The printer terminal device 400 thus advantageously facilitates improved accuracy in print job data collection in a manner that is seamless to the operation of a production print operator.

Figure 5:
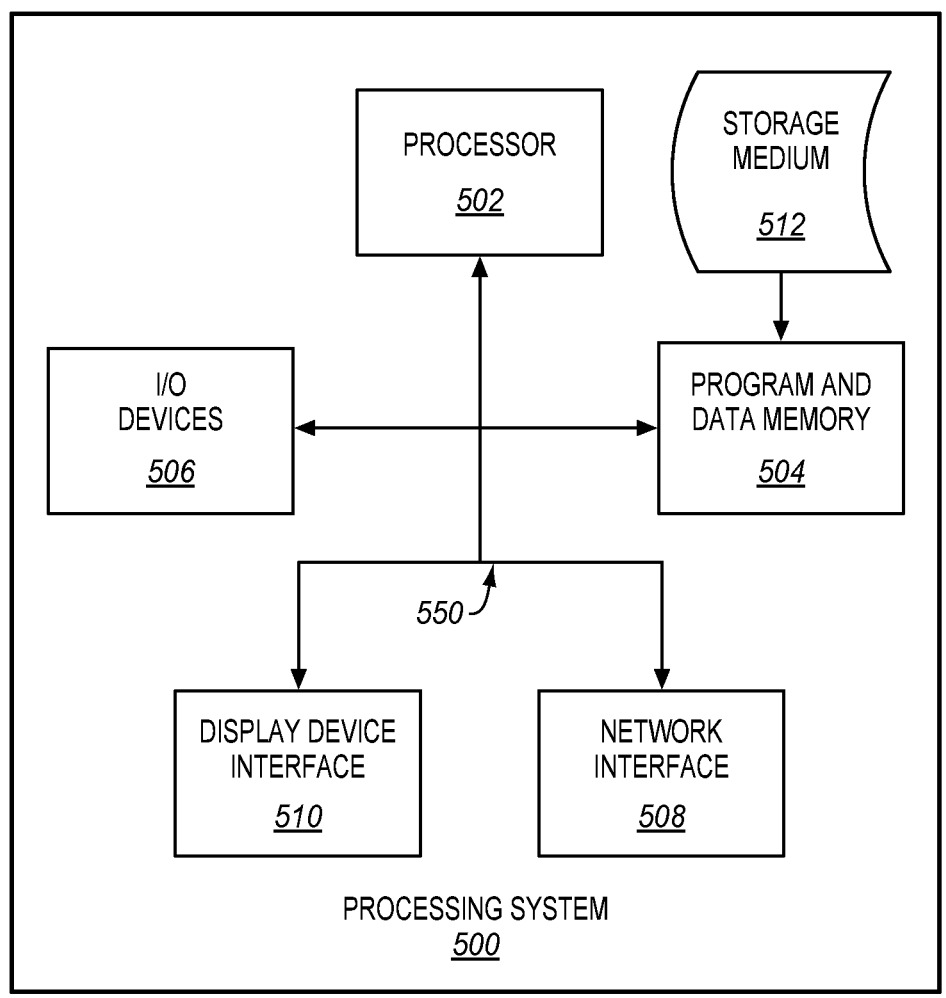
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 510 may be integrated with the system to interface to one or more display devices, such as printing systems and screens for presentation of data generated by processor 502.

Although specific embodiments were described herein, the scope of the invention is not limited to those specific embodiments. The scope of the invention is defined by the following claims and any equivalents thereof.

What is claimed is:

1. A system comprising:
a printer terminal device in communication with a printer and configured to retrieve metadata of a print job scheduled to print with the printer, and further in communication with a print job database and configured to:
retrieve, from the print job database, historical values of print material used for previous print jobs that correspond with the print job;
determine an estimate value range of print material used for the print job based on the historical values;
present a Graphical User Interface (GUI) at a display of the printer terminal device to receive user input of a current value indicating an amount of print material actually used during setup for the print job;
in response to determining that the current value of print material actually used is outside the estimate value range that was determined based on the historical values, display at the GUI a prompt for user input to validate that the current value is abnormal; and
in response to receiving user input validating that the current value is abnormal, provide the current value to the print job database to update the historical values of print material used.

2. The system of claim 1 wherein the printer terminal device is further configured to:
in response to receiving user input indicating that abnormality of the current value is an error, display at the GUI a prompt for user input to modify the current value.

3. The system of claim 2 wherein the printer terminal device is further configured to:
in response to determining that modification to the current value brings the current value within the estimate value range, provide the current value to the print job database to update the historical values of print material used.

4. The system of claim 1 wherein the printer terminal device is further configured to:
determine the estimate value range before initiating printing of the print job at the printer.

5. The system of claim 4 wherein:
the value of print material actually used includes one or more of a paper usage value, and an ink usage value for the setup process of the print job.

6. The system of claim 1 wherein the printer terminal device is further configured to:
determine the previous print jobs that correspond with the print job based on a print job type and a print job size of the print job.

7. The system of claim 1 wherein the printer terminal device is further configured to:
determine the estimate value range of print material used for the print job based on a speed of the printer and elapsed time of the print job.

8. A method comprising:
receiving a print job to be printed with a printer;
retrieving, from a print job database, historical values of print material used for previous print jobs that correspond with the print job;
determining an estimate value range of print material used for the print job based on the historical values;

presenting a Graphical User Interface (GUI) at a display to receive user input of a current value indicating an amount of print material actually used during setup for the print job;

in response to determining that the current value of print material actually used is outside the estimate value range that was determined based on the historical values, displaying at the GUI a prompt for user input to validate that the current value is abnormal; and in response to receiving user input validating that the current value is abnormal, providing the current value to the print job database to update the historical values of print material used.

9. The method of claim 8 further comprising:
in response to receiving user input indicating that abnormality of the current value is an error, displaying at the GUI a prompt for user input to modify the current value.

10. The method of claim 9 further comprising:
in response to determining that modification to the current value brings the current value within the estimate value range, providing the current value to the print job database to update the historical values of print material used.

11. The method of claim 8 further comprising:
determining the estimate value range before initiating printing of the print job at the printer.

12. The method of claim 11 wherein:
the value of print material actually used includes one or more of a paper usage value, and an ink usage value for the setup process of the print job.

13. The method of claim 8 further comprising:
determining the previous print jobs that correspond with the print job based on a print job type and a print job size of the print job.

14. A non-transitory computer readable medium embodying programmed instructions which, when executed by a processor, are operable for performing a method comprising:
receiving a print job to be printed with a printer;
retrieving, from a print job database, historical values of print material used for previous print jobs that correspond with the print job;
determining an estimate value range of print material used for the print job based on the historical values;

presenting a Graphical User Interface (GUI) at a display to receive user input of a current value indicating an amount of print material actually used during setup for the print job;

in response to determining that the current value of print material actually used is outside the estimate value range that was determined based on the historical values, displaying at the GUI a prompt for user input to validate that the current value is abnormal; and in response to receiving user input validating that the current value is abnormal, providing the current value to the print job database to update the historical values of print material used.

15. The medium of claim 14 wherein the method further comprises:
in response to receiving user input indicating that abnormality of the current value is an error, displaying at the GUI a prompt for user input to modify the current value.

16. The medium of claim 15 wherein the method further comprises:
in response to determining that modification to the current value brings the current value within the estimate value range, providing the current value to the print job database to update the historical values of print material used.

17. The medium of claim 14 wherein the method further comprises:
determining the estimate value range before initiating printing of the print job at the printer.

18. The method of claim 17 wherein:
the value of print material actually used includes one or more of a paper usage value, and an ink usage value for the setup process of the print job.

19. The medium of claim 14 wherein the method further comprises:
determining the previous print jobs that correspond with the print job based on a print job type and a print job size of the print job.

20. The medium of claim 14 wherein the method further comprises:
determining the estimate value range of print material used for the print job based on a speed of the printer and elapsed time of the print job.

* * * * *